(12) United States Patent
Rimanelli et al.

(10) Patent No.: US 11,930,124 B2
(45) Date of Patent: Mar. 12, 2024

(54) SYSTEM AND METHOD FOR THE COOPERATIVE OPERATION OF AERIAL AND TERRESTRIAL VEHICLES

(71) Applicants: Jon Rimanelli, Grosse Pointe Woods, MI (US); Walton Fehr, Mundelein, IL (US)

(72) Inventors: Jon Rimanelli, Grosse Pointe Woods, MI (US); Walton Fehr, Mundelein, IL (US)

(73) Assignee: AIRSPACE EXPERIENCE TECHNOLOGIES, INC., Detroit, MI (US)

( * ) Notice: Subject to any disclaimer, the term of this patent is extended or adjusted under 35 U.S.C. 154(b) by 0 days.

(21) Appl. No.: 17/300,309

(22) Filed: Jun. 2, 2021

(65) Prior Publication Data
US 2022/0345320 A1  Oct. 27, 2022

Related U.S. Application Data

(60) Provisional application No. 62/704,896, filed on Jun. 2, 2020.

(51) Int. Cl.
*H04L 9/32* (2006.01)
*H04L 67/10* (2022.01)
*H04L 67/12* (2022.01)

(52) U.S. Cl.
CPC ............ *H04L 9/3268* (2013.01); *H04L 67/10* (2013.01); *H04L 67/12* (2013.01)

(58) Field of Classification Search
CPC ........ H04L 9/3268; H04L 67/10; H04L 67/12
See application file for complete search history.

(56) References Cited

U.S. PATENT DOCUMENTS

| | | | | |
|---|---|---|---|---|
| 6,429,773 | B1* | 8/2002 | Schuyler | G07C 5/008 340/425.5 |
| 2021/0095973 | A1* | 4/2021 | Simard | G06Q 10/02 |

* cited by examiner

*Primary Examiner* — Kim T Nguyen
(74) *Attorney, Agent, or Firm* — Gregory D. DeGrazia; Miller, Canfield, Paddock and Stone PLC

(57) ABSTRACT

A system and a method of using a centralized hub that controls and authenticates which aerial and/or terrestrial vehicles are on a local vehicle operations travelway. Communications networks are established that can handle one-off decisions for local networks, regarding the vehicles. This centralized hub may be implemented for each location, and federated with other centralized hubs.

20 Claims, 10 Drawing Sheets

SYSTEM AND METHOD FOR THE COOPERATIVE OPERATION OF AERIAL AND TERRESTRIAL VEHICLES

CLAIM OF PRIORITY AND CROSS-REFERENCE TO RELATED APPLICATIONS

This application claims the benefit of priority from U.S. Provisional Patent Application No. 62/704,896, filed on Jun. 2, 2020, which is incorporated by reference in its entirety.

TECHNICAL FIELD

The present disclosure is related to connected and automated aerial vehicles, manned and unmanned aerial vehicles operated near the surface, and aerial vehicles operated in coordination with terrestrial vehicles. This disclosure is an organizational structure needed to support cooperative, autonomous, and automated operation of aerial and terrestrial vehicle.

BACKGROUND

Operators of aerial vehicles need tools and practices so that they can use those vehicles in business operations that have the potential to scale to large areas, and so that multiple individual business and governmental agencies can operate those vehicles safely and efficiently in a shared environment.

Manned and unmanned aerial vehicles, operated near the surface, rely on human actions from the start of a flight to the end of the flight. Current aerial vehicles operated near the surface are operated randomly by a human operator either on the ground or in the vehicle. There is no general established pattern for the vehicles to follow that takes into account the environment in which the vehicle will operate, or way to describe that pattern. Typically, one operator is needed for each vehicle.

It is up to individuals to decide where to operate their aerial vehicle. Individuals are responsible for avoiding features on the surface such as buildings, trees, and utility lines. They are also responsible for knowing where their vehicles are allowed to operate.

SUMMARY

This disclosure describes a system and a method of using a centralized hub that controls/authenticates which aerial and/or terrestrial vehicles are on a local vehicle operations travelway. Communications networks are established that can handle one-off decisions for local networks, regarding the vehicles. This centralized hub may be implemented for each location, and federated with other centralized hubs (e.g., for purposes of identification/authentication, etc.).

Additionally, the system and method establishes conventions regarding where the vehicles can operate, based not only on community preferences (e.g., protecting the privacy or property rights of individual), but may also be based on spontaneous events that limit where the vehicles can operate (e.g., civil emergencies, special events, etc.). While practitioners have concentrated on building single-purpose or local implementations of businesses or government agencies using aerial vehicles without consideration of how those vehicles would interact and coexist with other's aerial vehicles, the system and method provides a common practice that would be used. As such, regardless of location, the vehicles will operate based on similar rules.

The system and method would allow one operator to control multiple vehicles, or for the vehicles themselves to operate in coordination, such as a platoon. Also, fully automated operation of routine tasks, such as the repeated delivery of goods or people from one place to another, may be more easily facilitated.

A common understanding of consistent rules of operation of vehicles (all vehicles operate on the right side of the road, trains stop when they approach a red block signal, etc.) has greatly benefited surface transportation. Similar rules of operation have not been defined for the new class of aerial vehicles being developed for operation near the surface. As such, these vehicles must currently be operated within the view of a human operator, either in the vehicle or on the ground controlling the vehicle remotely. No formal rules of operation have been developed. Operators must decide what to do whenever a conflict or potential conflict occurs among vehicles operating near each other. The present disclosure provides a method for operating these aerial vehicles so that they can go about their intended tasks safely and efficiently, when in the presence of other such vehicles. The method provides a definition for travelways and the rules of operation for long-term use so users could become familiar with them and the use of the system could be optimized. At the same time, definitions of the travelways may be modified quickly and/or temporarily to avoid local catastrophes or natural disasters The present disclosure also provides an improvement on the features made available to aerial vehicles to make them easier for manned and automated operation.

The travelways would facilitate autonomous operation beyond line-of-sight of an operator. There could be operating rules that would allow an operator to move a vehicle onto a travelway. Once on the travelway, the vehicle would follow it like a train on rails with its operation coordinated by Centralized hub with its distributed management system.

Once a vehicle reaches its destination, it could automatically dock to finish its operation or be taken over by an operator who is within line-of-sight.

Figure 1:
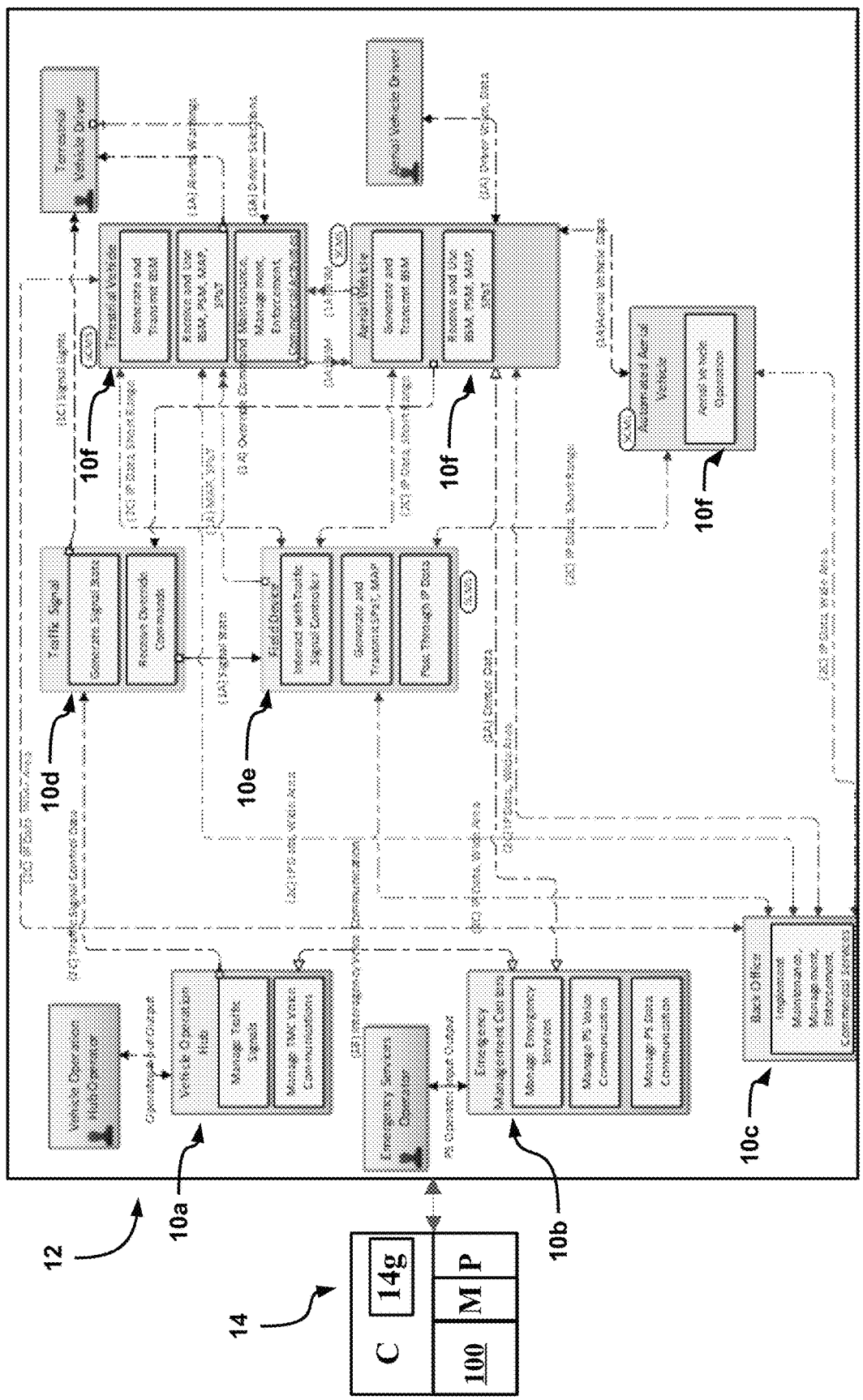
FIG. 1 is a schematic block diagram of a transportation system for being operatively controlled by a centralized hub.

The present disclosure is amenable to various modifications and alternative forms, and some representative embodiments are shown by way of example in the drawings and will be described in detail herein. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed by the appended claims.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure. Furthermore, the drawings are in simplified form and are not to precise scale. For purposes of convenience and clarity only, directional terms such as top, bottom, left, right, up, down, upper, lower, upward and downward may be used with respect to the drawings. These and similar directional terms are not to be construed to limit the scope of the disclosure in any manner. Additionally, the disclosure, as illustrated and described herein, may be practiced in the absence of any element that is not specifically disclosed herein.

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure. Furthermore, the drawings are in simplified form and are not to precise scale. For purposes of convenience and clarity only, directional terms such as top, bottom, left, right, up, down, upper, lower, upward and downward may be used with respect to the drawings. These and similar directional terms are not to be construed to limit the scope of the disclosure in any manner. Additionally, the disclosure, as illustrated and described herein, may be practiced in the absence of any element that is not specifically disclosed herein.

Referring to the drawings, wherein like reference numbers refer to like components throughout the several Figures, FIG. 1 shows a schematic diagram of a transportation system 12 for being operatively controlled by a centralized hub 14, using method 100. The transportation system 12 The centralized hub 14 is configured to control and/or authenticate which aerial and/or terrestrial vehicles 16 are on a local vehicle operations travelway 18. As will be explained in more detail below, travelways 18 are paths for vehicles 16, including terrestrial and/or aerial vehicles, to travel relative to one another and relative to fixed features, in accordance with national and/or local wishes. For example, a travelway 18 may be configured such that the vehicles 16 cannot fly over people's houses, under power lines, and the like. The vehicles 16 may be automated, operative by operators, and the like.

With continued reference to FIG. 1, the system 12 includes a plurality of objects 10 configured to interact with one another. It should be appreciated that even though the diagram in FIG. 1 only shows one of each type of object 10, the system 10 may be scaled to include all objects 10 used in a local area, region, nation, continent, and the like. The system 12 may include physical components, including, but not limited to servers in a data center, electronic control units in aerial and/or terrestrial vehicles, and the like.

The system 12 is configured such that application or software objects are hosted by one or more of the physical components, such that information flows therein to support the operation of the objects 10. The objects 10 may include a vehicle operation center 10*a*, an emergency management service center 10*b*, a back office 10*c*, moving objects 10*d*, fixed objects 10*e*, embedded objects 10*f*, and the like. The moving and fixed objects 10*d*, 10*e* are typically located at the side of the road. Embedded objects 10*f* may be those objects embedded within the vehicles 16. Information flows may be implemented between the objects 10 (10*a*, 10*b*, 10*c*, 10*d*, 10*e*, 10*f*, 10*g* and the like) using Internet protocol peer-to-peer data exchanges or broadcasts using a dedicated short-range wireless medium or wide area network media.

With continued reference to FIG. 1, the centralized hub 14 functions as a security credential management system (SCMS) 10g. The SCMS 10g may be configured to create and maintain the security credentials between the vehicles 16 having the embedded objects 10f. The centralized hub 14 includes at least one controller (C) equipped with requisite memory (M) and a processor (P), as well as associated hardware and software such as an oscillator, input/output circuitry, etc. The memory (M) may include a computer-readable medium or media, including sufficient amount of read only memory, for instance magnetic or optical memory, on which is recorded computer-readable diagnostic instructions embodying executable portions of the method 100 described below. In some embodiments, the SCMS 10g is recorded in memory (M), with execution by the processor (P) of the diagnostic instructions embodying the method 100 causing the centralized hub 14 to perform the various aspects of the method 100 as set forth below.

Figure 2:
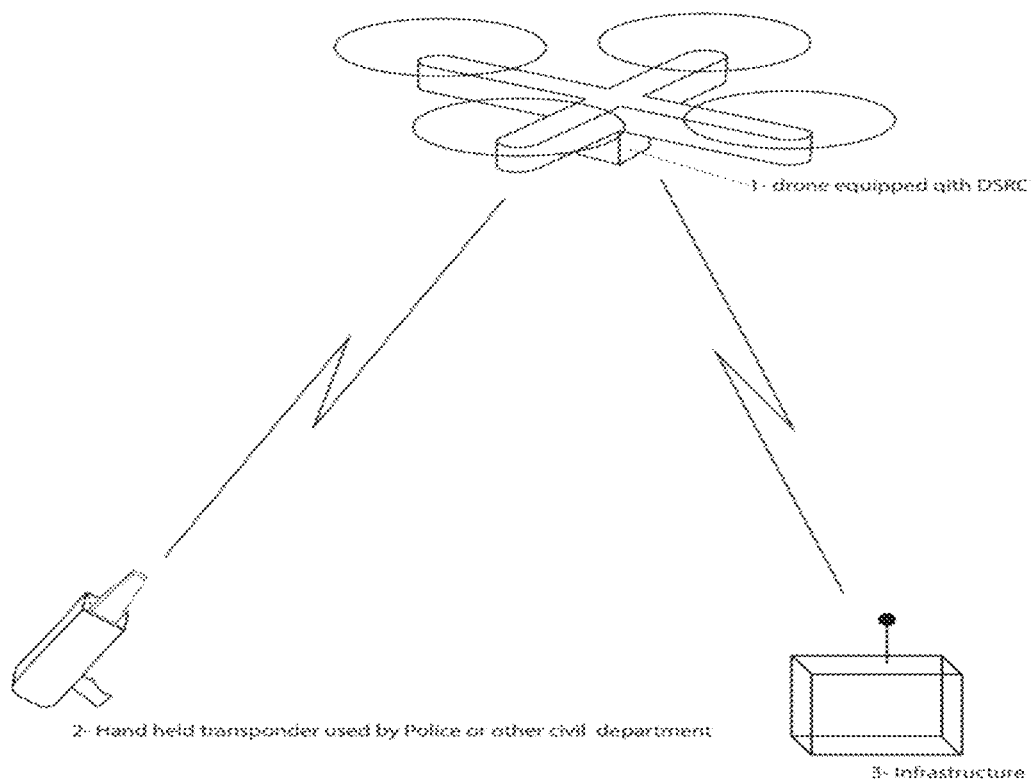
FIG. 2 is a schematic diagrammatic view illustrating the identity of a vehicle established by an authorized user either using a portable device or a fixed station.

As illustrated in FIG. 2, the identity of a vehicle 16 may be established by an authorized user either using a portable device, a fixed station, and the like.

Figure 3:
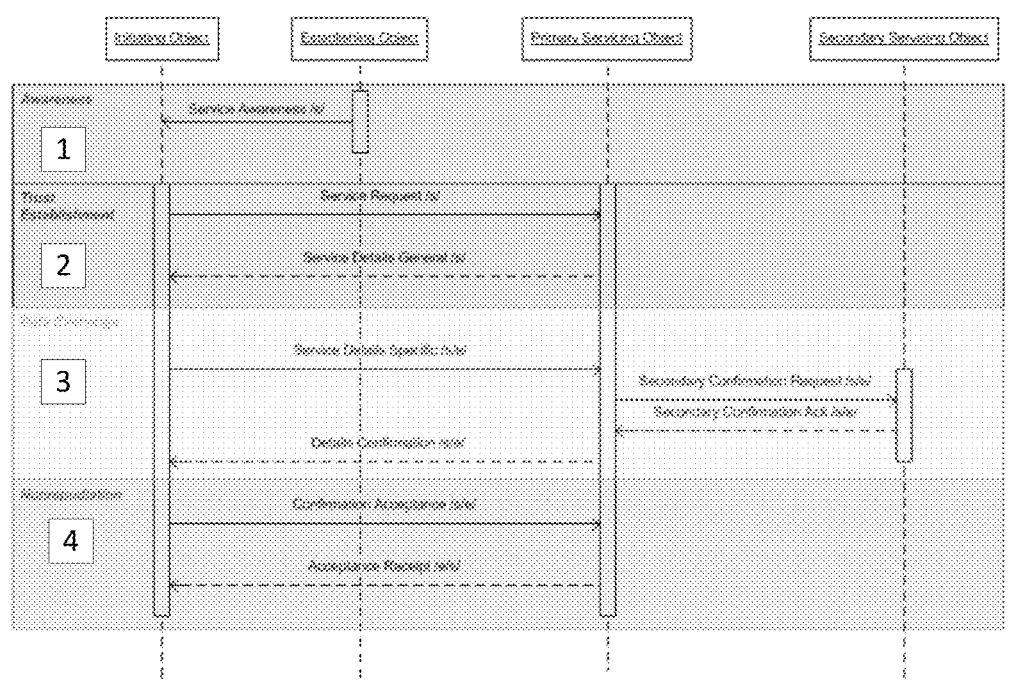
FIG. 3 is a schematic block diagram illustrating a sequence of message exchanges between the devices of FIG. 2.

FIG. 3 shows the sequence of message exchanges between the devices show in FIG. 2 so that the result is trusted and the exchange is private using the cryptographic processes established and maintained by the SCMS 10g in FIG. 1. Any devices authorized by the centralized hub 14 would be able to transmit an advertisement of a request for vehicles 16 to identify themselves during the first phase of the data exchange sequence, illustrated as element number 1 in FIG. 3. That advertisement may include a specific criteria, such as all vehicles operating in a specific area should identify themselves. That advertisement message may be cryptographically signed using a certificate issued by the centralized hub's 14 SCMS 10g.

Any vehicle targeted by the advertisement would be obligated by system rules to respond to the advertisement during the second phase of the exchange, illustrated as element number 2, with an anonymous response signed with a certificate also issued by the centralized hub's 14 SCMS 14g. Both devices now have the ability to mutually authenticate each other as valid participants in a private, encrypted data exchange during the third phase of the sequence, illustrated as element number 3. During that exchange the requester's identity and the vehicle's identity would be exchanged privately so unintended parties would not know the details of the exchange. The exchange would finish during the fourth phase, illustrated as element number 4, of the exchange so that both parties would have an equal record of the transaction so disputes could be settled sometime in the future.

System management and organization is embodied in the Vehicle Operation Hub. Although shown as on object on the diagram, this function will be distributed throughout the eventual continental-scale installation assuring consistent implantation and operation. The Hub would use cryptographic processes embodied in the Security Credential Management System, illustrated as element number 2, to assure that all objects are trusted and have the ability protect ownership of data that flows throughout the implementation. Other infrastructure-based objects such as emergency services operation centers and other business centers would also be distributed throughout the implementation.

Appended are descriptions key features implemented using the Hub as a system for organization and coordination of vehicle travel. The following sections provide descriptions of the A) Travelways that would be created, maintained, and distributed by the HUB to form the backbone of the operating strategy; B) strategies for Autonomous Operation along the travelways with handoffs to manual operation when needed; C) strategies for general Operation of all classes of vehicles so that operations can scale; and D) the short-range and wide-area wireless communication needed for coordinated and automatic vehicle coordination.

Section A—Travelways

The present disclosure also relates to connected and automated aerial vehicles, manned and unmanned aerial vehicles operated near the surface, aerial vehicles operated in coordination with terrestrial vehicles. This disclosure is a three-dimensional set of mathematical expressions that precisely describe the travelways for aerial and terrestrial vehicles as a set of lines and intersections.

For many years, people have envisioned flying cars [4-1] operating in neat patterns confined to defined travelways [4-3] just as terrestrial vehicles [4-2] do in a network of roadways or trains in a system of rails (FIG. 1). The centralized hub 14 and method 100 are configured to establish conventions regarding where the vehicles may operate, based not only on community preferences (e.g., protecting the privacy or property rights of individual), but may also be based on spontaneous events that limit where the vehicles can operate (e.g., civil emergencies, special events, etc.).

These conventions may be provided via a mathematical model of three-dimensional travelways, in the form of point sets or equations of line segments, that are connected in a web to describe the paths for allowed operation. The nodes in the web would be the "sphere-abouts" we talked about that would facilitate movement from one line segment to another (left-right-through and up-down) without stopping. Controls at the nodes would not be operated like traffic lights that cause start-stop operation at intersections, but as coordination points were vehicles negotiating the control point would be timed and spaced for continuous operation.

Figure 4:
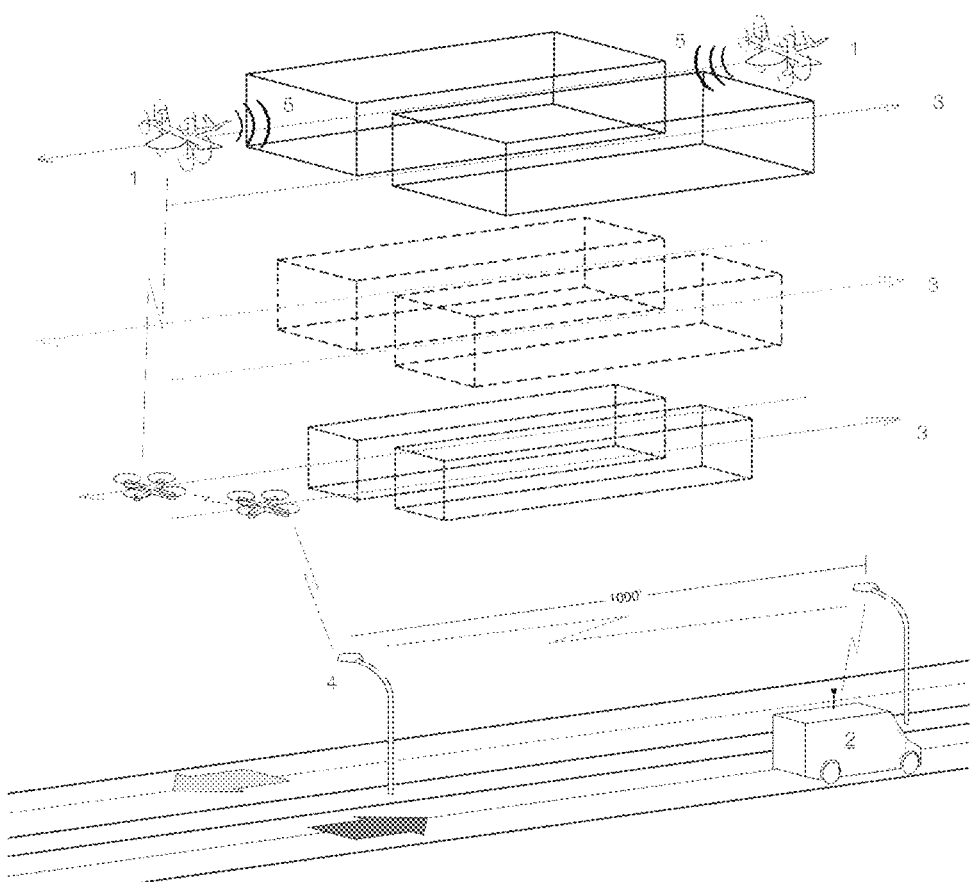
FIG. 4 is a schematic diagrammatic view illustrating that communication from the hub is used to distribute mathematical models that define the travelway.

Travelways in the air would be sized to accommodate the type of vehicles likely to operate in them with larger, faster vehicles in larger travelways at the highest level and smaller, slower vehicles in the lower layer. This disclosure defines a method for defining the travelways as mathematical models so that the equipment in an aerial vehicle will have a well-defined path to follow. With reference to FIG. 4, element 4 shows that communication from the Hub is used to distribute the mathematical models that define the travelways. With continuing reference to FIG. 4, communication among vehicles (illustrated as element 5) is also used to help distribute travelway information as well as state information about the individual vehicles.

Figure 5:
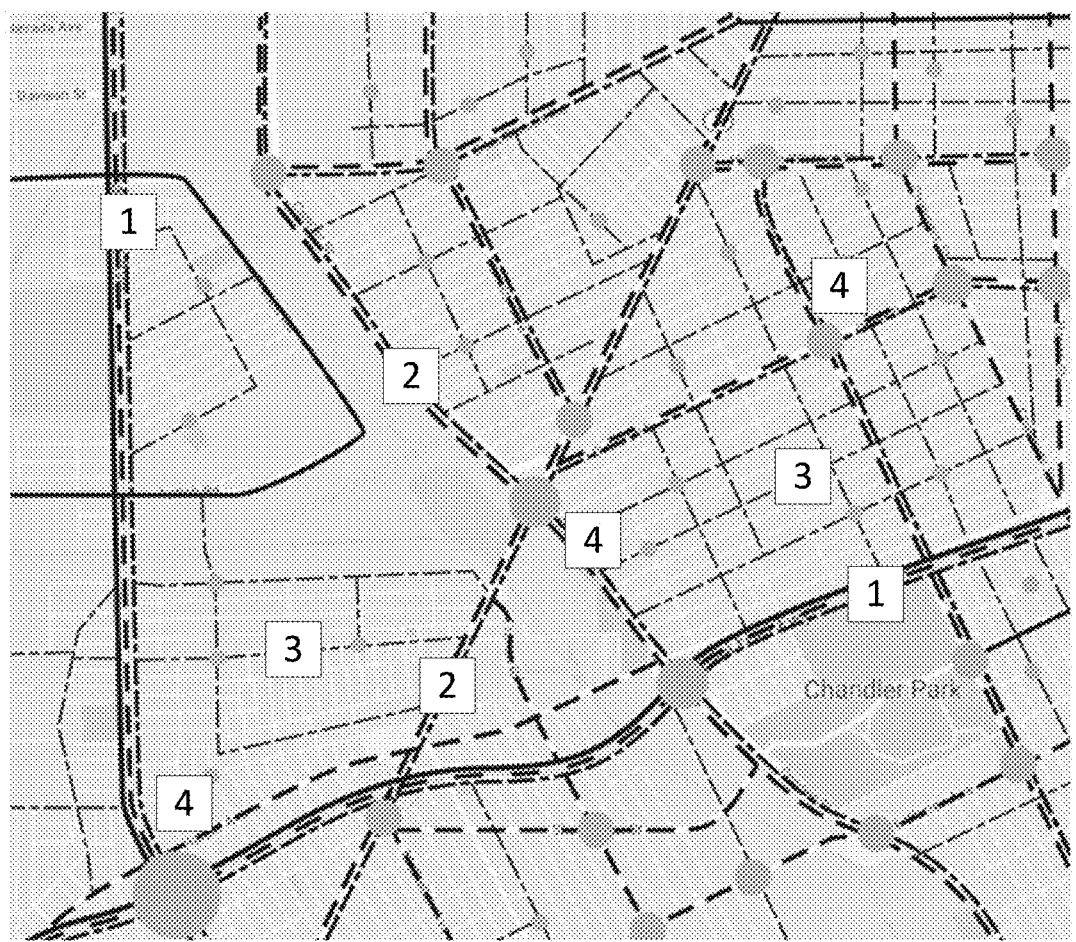
FIG. 5 is a schematic plan view of a map illustrating travelways defined above existing surface travelways or other natural features of the environment.

Travelways would be defined to exist above existing surface travelways, or other natural features of the environment such as utility rights-of-way where aerial vehicles would be acceptable. Larger terrestrial features such as Interstate highways 1 or state highways 1 (FIG. 5) would accommodate travelways (illustrated as circles throughout FIG. 5) at all three levels. Arterial streets, illustrated as element 2 in FIG. 5, may be configured to accommodate the two lower layers and minor streets, illustrated as element 3 in FIG. 5, would accommodate the layer just above the street level. Sphere-abouts, illustrated as element 4 in FIG. 5, would facilitate the intersections between both travelways at the same level and those at levels above or below.

Figure 6:
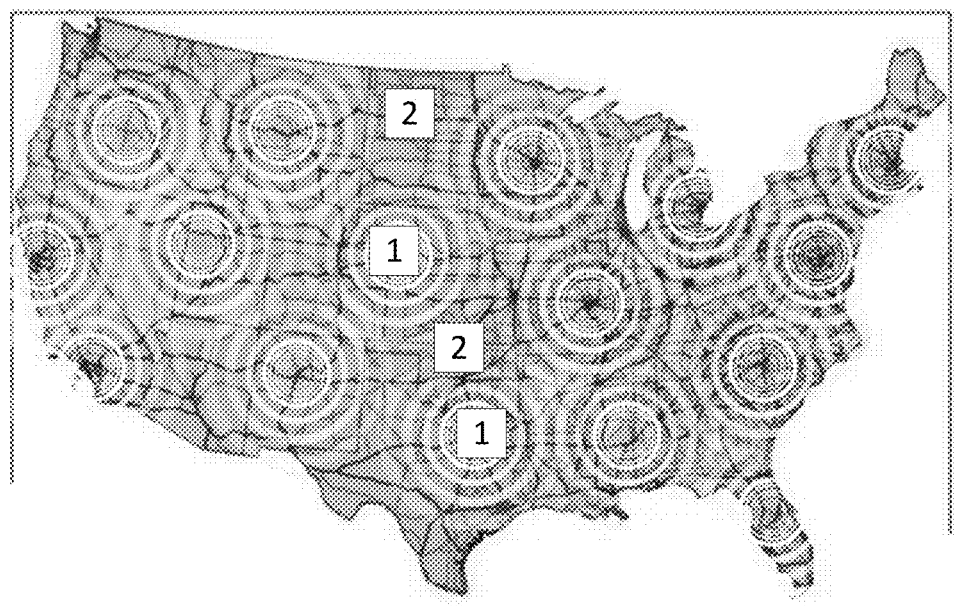
FIG. 6 is a schematic plan view of a map illustrating locations where installations would start where short-range wireless and wide-area network communications are available, and that the pattern would extend out over the terrestrial highway network or through rail or utility corridors that connect urban areas.

The mathematical models would be designed so that they can scale from the most local neighborhood to larger regions to complete cities to full nations and continents (FIG. 3) so that a vehicle could travel widely using the same travelway definition conventions. Installations would start in locations where short-range wireless and wide-area network communications are available, illustrated as element 1 in FIG. 6. The pattern would extend out over the terrestrial highway network, illustrated as element 2 in FIG. 6, or through rail or utility corridors that connect the urban areas.

Figure 7:
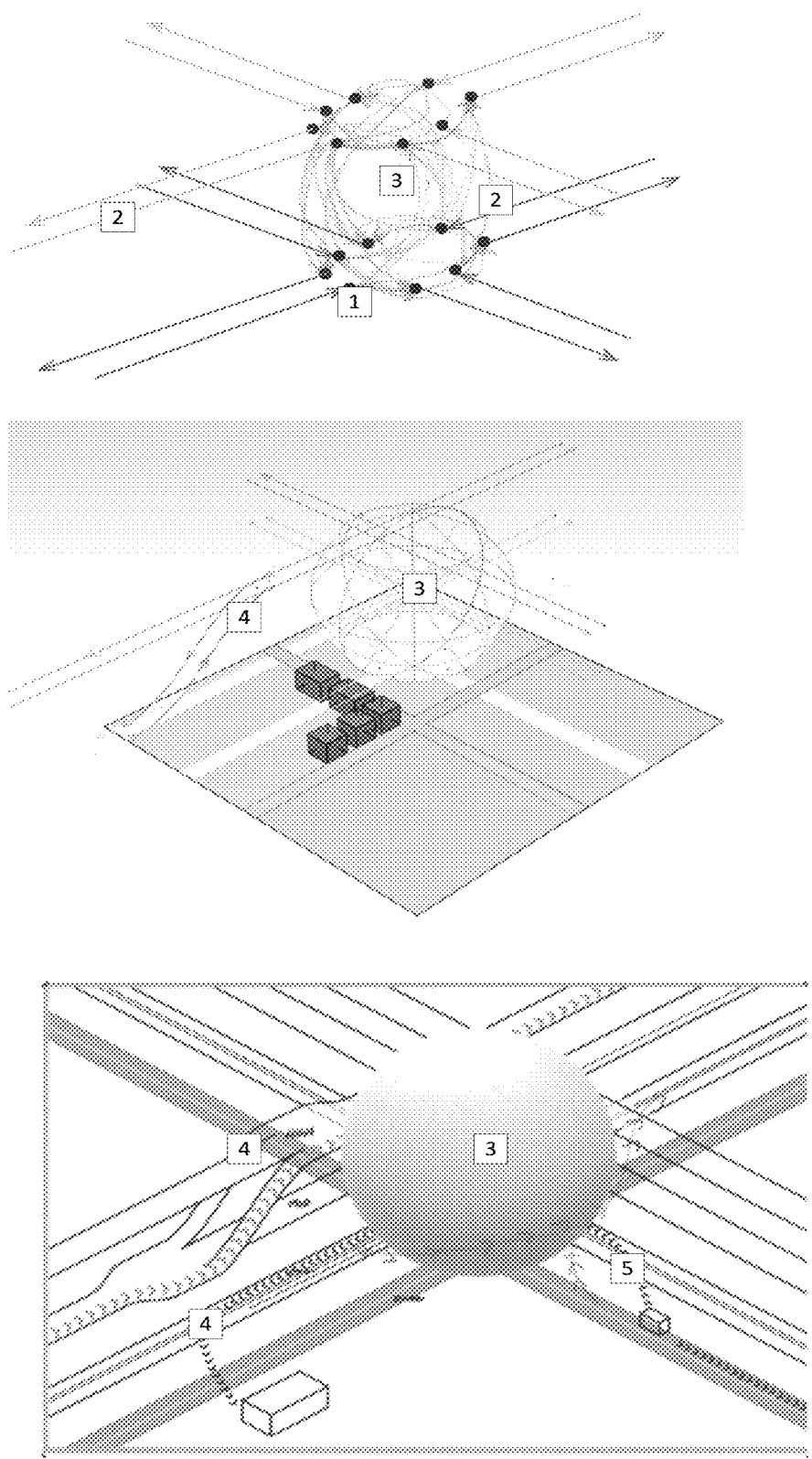
FIG. 7 is a schematic diagrammatic view illustrating a collection of lines defined by polynomial equations to describe the travelway to the precision needed.

The definition of the travelways (FIG. 4) would consist of a collection of lines, illustrated as element 2 in FIG. 7, defined by polynomial equations in terms of latitude, longitude, and elevation or point sets consisting of 3-tupples of values of latitude, longitude, and elevation connected at points, illustrated as element 1 in FIG. 7, sufficiently detailed to describe the travelway to the precision needed. Additional information may be tagged to points on the line to give supplemental information like direction of travel, speed limits, or other constraints on vehicle operation.

Operating conventions would also be established in addition to defining the centerline of the travelway. By way of a non-limiting example, the lines would be layered in such a way that larger, higher performance vehicles would operate at higher levels. Likewise, lower layers would be reserved for smaller, lower performance vehicles.

Intersections of two or more lines would be defined by more detailed definitions mathematical descriptions that would define sphere-abouts, illustrated as element 3 in FIG. 7, a three-dimensional equivalent of a terrestrial roundabout with approaches and exits from the end of one line to the beginning of the next. The sphere-abouts may be configured to facilitate changes in level, as well as changes in direction. Pathways would take their shape from the theoretical sphere in the center, illustrated as element 3 in FIG. 7. It should be appreciated that the object in the center may actually be more cone-shaped, i.e., narrower at the bottom, when interchanges between lower-speed travelways are facilitated and wider at the top where vehicle speeds would be higher.

Simpler interchanges could be provided to facilitate changes in level or between levels and fixed terrestrial features such as defined landing points, illustrated as element 4 in FIG. 7, where complex intersections are not needed. Ad hoc interchanges between aerial travelways and terrestrial vehicles could also be defined, illustrated as element 5 in FIG. 7.

Section B—Autonomous Operation

The present disclosure also provides an improvement on the features made available to aerial vehicles to make them easier for manned and automated operation. The travelways would facilitate autonomous operation beyond line-of-sight of an operator. There could be operating rules that would allow an operator to move a vehicle onto a travelway. Once on the travelway, the vehicle would follow it like a train on rails with its operation coordinated by Hub with its distributed management system. Once a vehicle reaches its destination, it could automatically dock to finish its operation or be taken over by an operator who is within line-of-sight.

Figure 8:
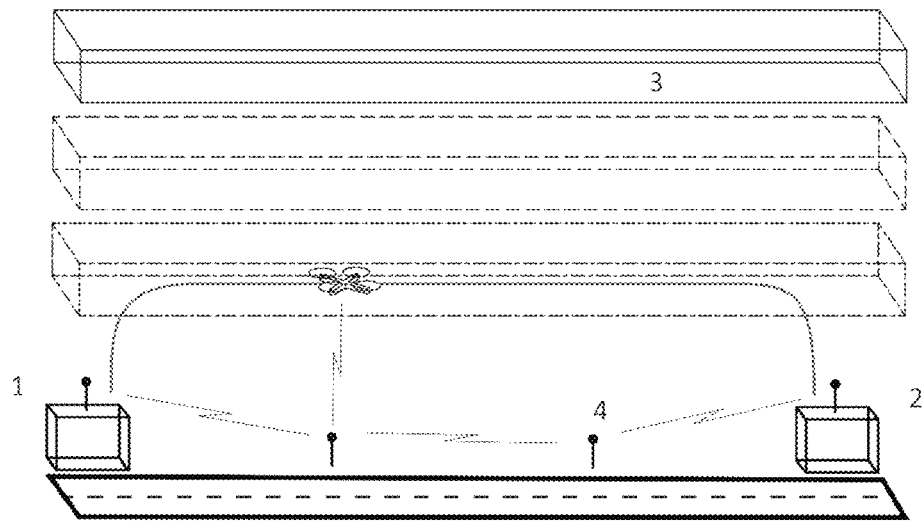
FIG. 8 is a schematic diagrammatic view illustrating one use of automation of travel from a particular origin to a particular destination.
Figure 9:
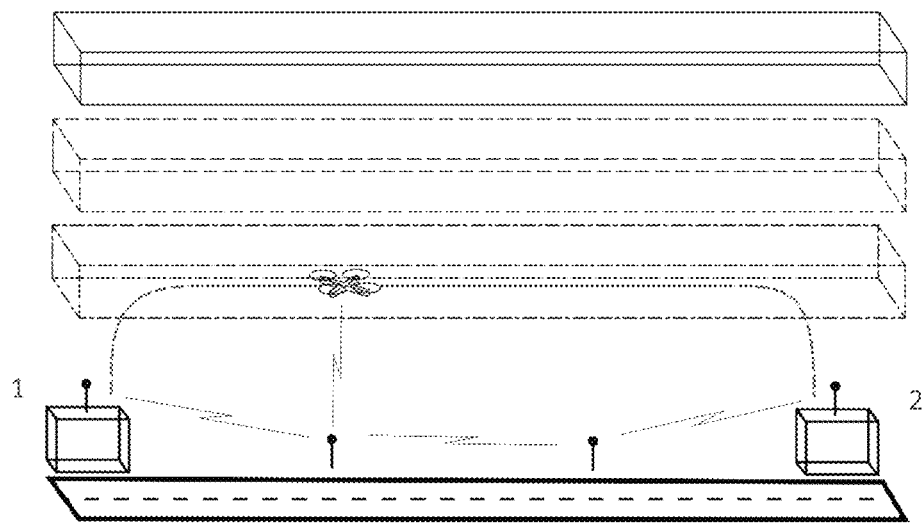
FIG. 9 is a schematic diagrammatic view illustrating one use of automation of travel from a particular origin to a particular destination, where a human operator is needed for fine control at either end of the travel.
Figure 10:
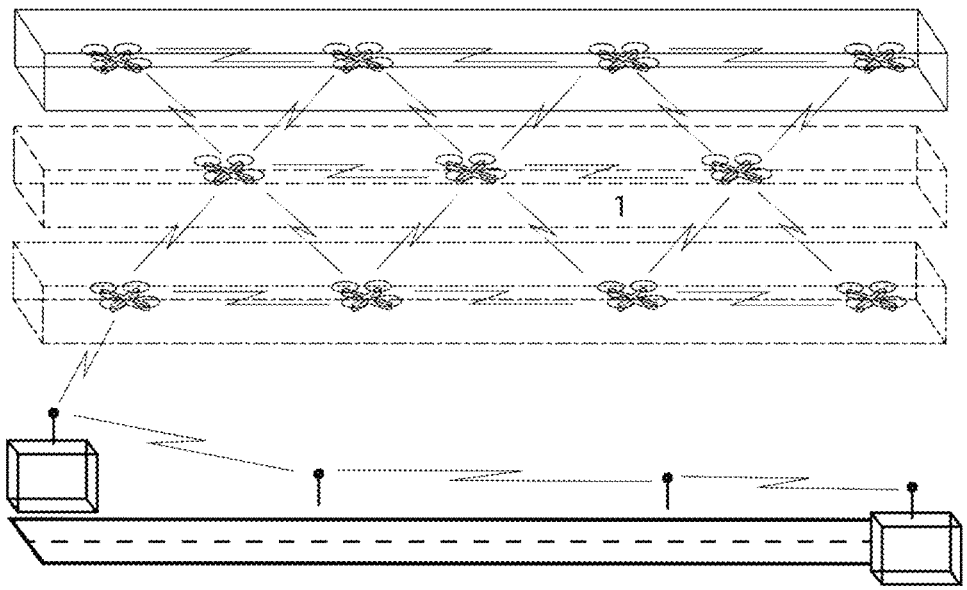
FIG. 10 is a schematic diagrammatic view illustrating one use of automation of travel from a particular origin to a particular destination, where short-range wireless communication would be used to share state information so vehicles can automatically avoid one another and coordinate their operation autonomously.

With reference to FIGS. 8-10, there are three main uses of automation. FIG. 8 illustrates travel from a particular origin to a particular destination. This could be an ad hoc activity such as fulfilling a customer order from a warehouse, illustrated as element 1 in FIG. 8, to a specific customer, illustrated as element 2, or repetitive operation such as restocking a retail outlet. Automatic docking and undocking at either end would be used for loading and unloading, charging batteries, adding fuel. The vehicle(s) would be in constant communication with the Hub, to coordinate operation and to receive system updates, and with the vehicle operator, so they can maintain control over the vehicle using short-range wireless or wide-area communication, illustrated as element 3 in FIG. 8, between the vehicle and infrastructure objects using fixed access points, illustrated as element 4 in FIG. 8. The Hub may also be configured to serve as a repository for the application objects distributed among vehicle equipment and field equipment.

FIG. 9 illustrates traveling most of the way from an origin to a destination where a human operator is needed for fine control at either end. In this case, the vehicle would be sent automatically into the travelway network by the vehicle's operator at the start of the trip. illustrated as element 1 in FIG. 9. When the vehicle arrives near its destination, a human operator would take direct control illustrated as element 2 in FIG. 9, to finish the vehicle movement.

FIG. 10 illustrates cooperative operation among vehicles during the trip to fully utilize the capacity of the travelways and to avoid conflicts. Short-range wireless communication, illustrated as element 1 in FIG. 10, would be used to share state information such as location, speed, destination, priority so vehicles could automatically avoid each other and coordinate their operation autonomously.

Section C—System Operation

The present disclosure is also related to providing a method for operating these aerial vehicles so that they can go about their intended tasks safely and efficiently, when in the presence of other such vehicles.

A common understanding of consistent rules of operation of vehicles (all vehicles operate on the right side of the road, trains stop when they approach a red block signal, etc.) has greatly benefited surface transportation. Similar rules of operation have not been defined for the new class of aerial vehicles being developed for operation near the surface. As such, these vehicles must currently be operated within the view of a human operator, either in the vehicle or on the ground controlling the vehicle remotely. No formal rules of operation have been developed. Operators must decide what to do whenever a conflict or potential conflict occurs among vehicles operating near each other.

The definition of the travelways and the rules of operation would be defined for long-term use so users could become familiar with them and the use of the system could be optimized. At the same time, definitions of the travelways could be modified quickly and temporarily to avoid local catastrophes or natural disasters.

Figure 11:
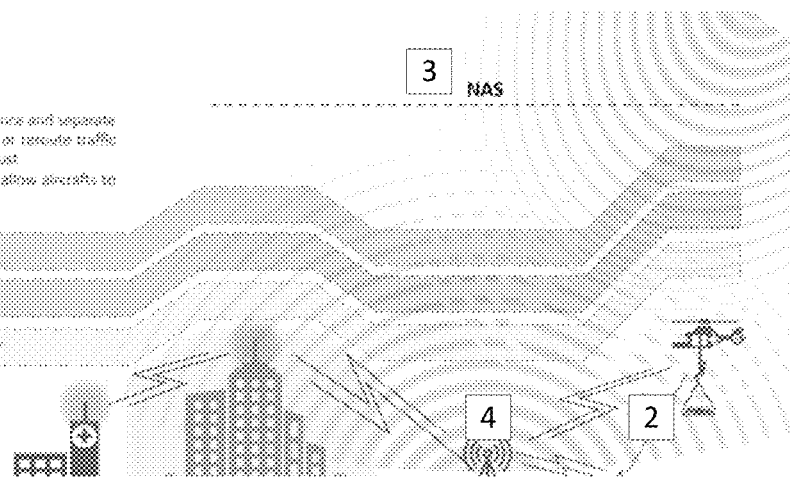
FIG. 11 is a schematic diagrammatic view illustrating that rules of operation and mathematical models are created and used for vehicle operation.

Rules of operation and mathematical models would be created and used for the vast majority of vehicle operation as shown in FIG. 11. Details of the established travelways, illustrated as element 1 in FIG. 11, would be constantly available to vehicles operating in an area from the Hub, illustrated as element 4 in FIG. 11. Established, long-term activities such as dedicated aerial freight corridors, illustrated as element 2 in FIG. 11, would be built into the normal travelway patterns. All of this activity would take place blow the established National Air Space, illustrated as element 3 in FIG. 11.

Special cases necessitate temporary or possibly permanent changes to the mathematical models or rules of operation.

Figure 12:
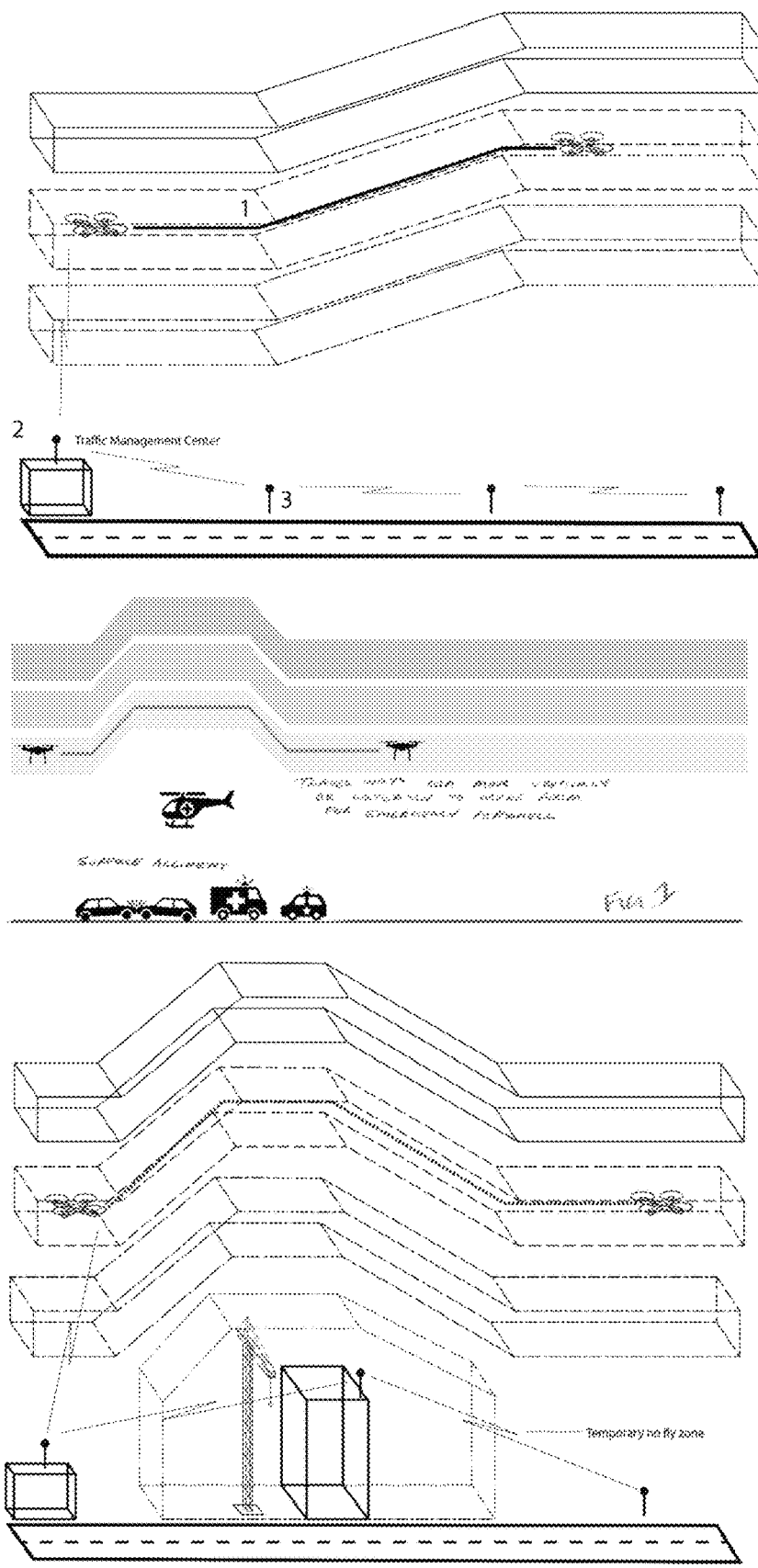
FIG. 12 is a schematic diagrammatic view illustrating a temporary change to the vertical definitions of travelways while near surface rescue activities take place, where the temporary changes to the travelways are distributed using short-range wireless or wide-area network communication.

FIG. 12 shows a temporary change to the vertical definitions of travelways while near surface rescue activities take place. Changes, illustrated as element 1 in FIG. 12, to travelways or rules of operation could be directed by a civil authority, illustrated as element 2 in FIG. 12, when roadway operators have a need such as a construction project that locates cranes in existing travelways when emergency services needs to clear the air space because of an incident or event. These temporary changes to the travelways would be distributed using short-range wireless or wide-area network communication.

Figure 13:
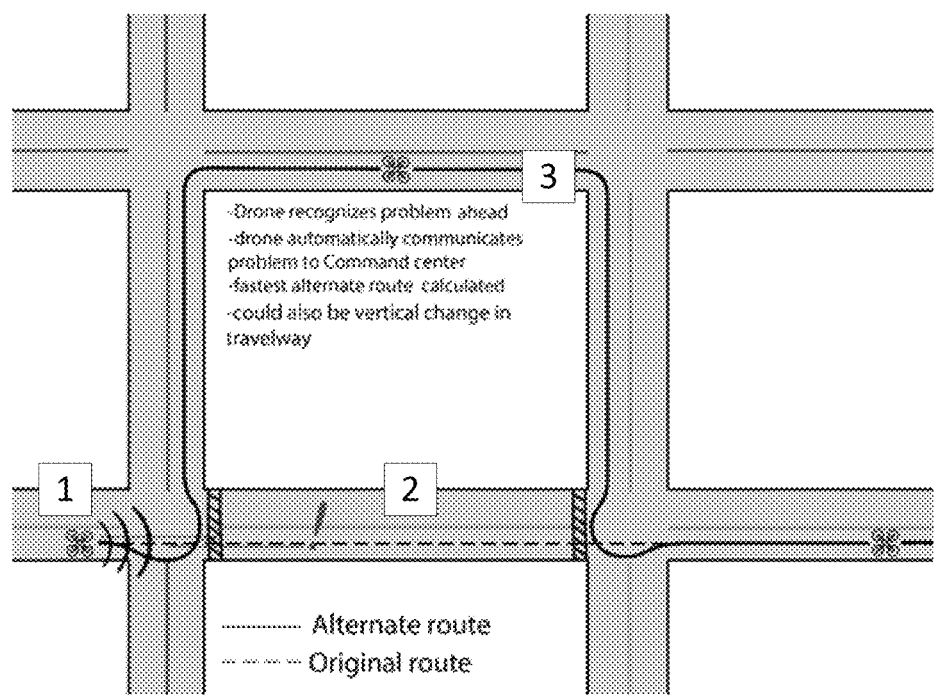
FIG. 13 is a schematic diagrammatic view illustrating an embodiment where equipment on the vehicle itself is configured to detect danger ahead in an established travelway, such that a different route for the vehicle is selected to avoid the danger.

FIG. 13 shows the case where equipment on the vehicle itself, illustrated as element 1 in FIG. 13, is able to detect danger ahead in an established travelway, illustrated as element 2 in FIG. 13. An application object in the on-board equipment could then choose a different route, illustrated as element 3 in FIG. 13, around the temporary issue. Knowledge of the detected issue would be shared with other vehicles using the facilities of the Hub.

Section D—Communication

This disclosure also provides an improvement on the types of communication available for coordinating the operation of these aerial vehicles when they are operated near each other.

Current unmanned aerial vehicles operated near the surface rely on point-to-point radio communication between a specific vehicle and the controller being used by an operator on the ground. Manned aerial vehicles operated near the surface would rely on the same voice and data radio communications use by conventional aerial vehicles operated at typical operating levels. There is no radio-based ability for multiple aerial vehicles to automatically coordinate their operation.

Current aerial vehicle makers have not anticipated the need for coordinated and automated operation of aerial vehicles operating near the surface. These vehicles will have to coordinate well regardless of who builds them, owns them, or operates them. Vehicles participating in the use of the travelways would rely heavily on wireless communication for vehicle-to-vehicle coordination and to interact with the infrastructure for system management. This wireless communication will be a combination of vehicle-to-infrastructure communication using current wide-area network (cellular) infrastructure currently in place (4G) or planned for deployment soon (5G); or a short-range wireless medium that is currently being developed for terrestrial vehicles (DSRC, C-V2X). Using the same technology as terrestrial vehicles would greatly ease the coordination between the terrestrial and aerial vehicles.

Figure 14:
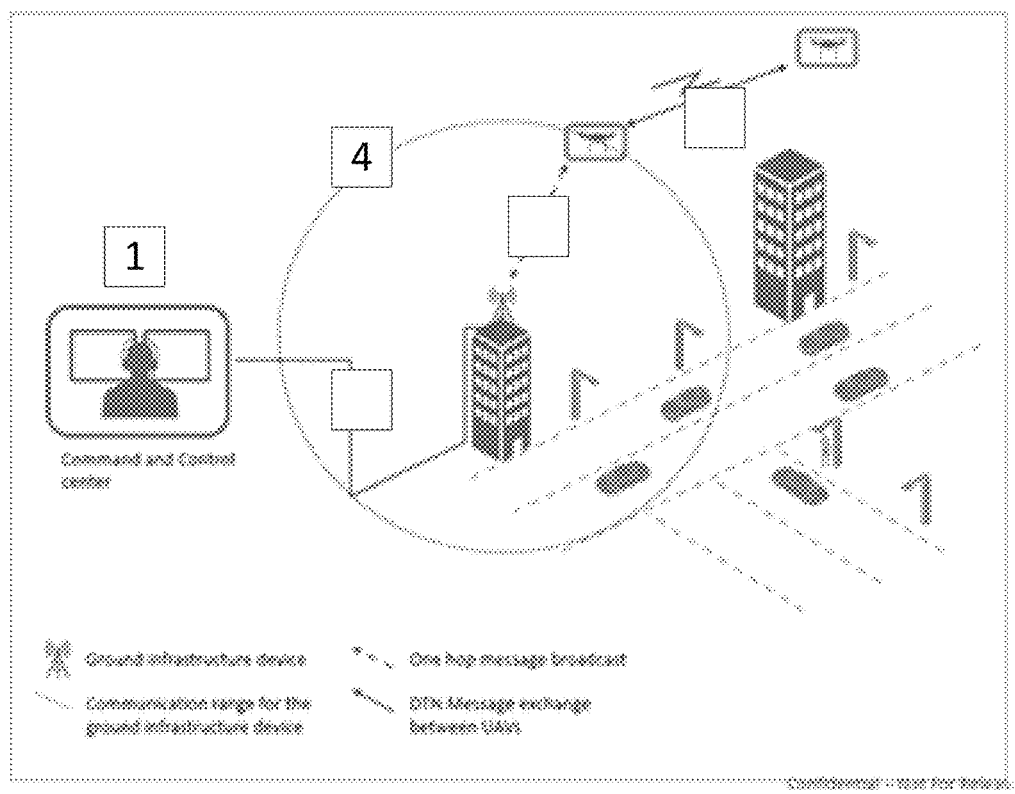
FIG. 14 is a schematic diagrammatic view illustrating the centralized hub, or other operation center, issuing instructions via the internet to an access point in the infrastructure, such that instructions are relayed wirelessly to a nearby vehicle within the range of the access point, where those instruction are then relayed wirelessly to other vehicles that are nearby.

FIG. 14 shows the typical communication patten used for vehicle operation and coordination. The Centralized hub or other operation center in the fixed infrastructure, illustrated as element 1 in FIG. 14, issues instructions via the Internet, illustrated as element 2 in FIG. 14, to an access point in the infrastructure, illustrated as element 3 in FIG. 14. That instruction is relayed wirelessly to a nearby aerial (or terrestrial) vehicle within the range of the access point, illustrated as element 4 in FIG. 14. That instruction may be relayed again wirelessly to other vehicles that may be within the radio range of the first vehicle, illustrated as element 5 in FIG. 14.

Figure 15:
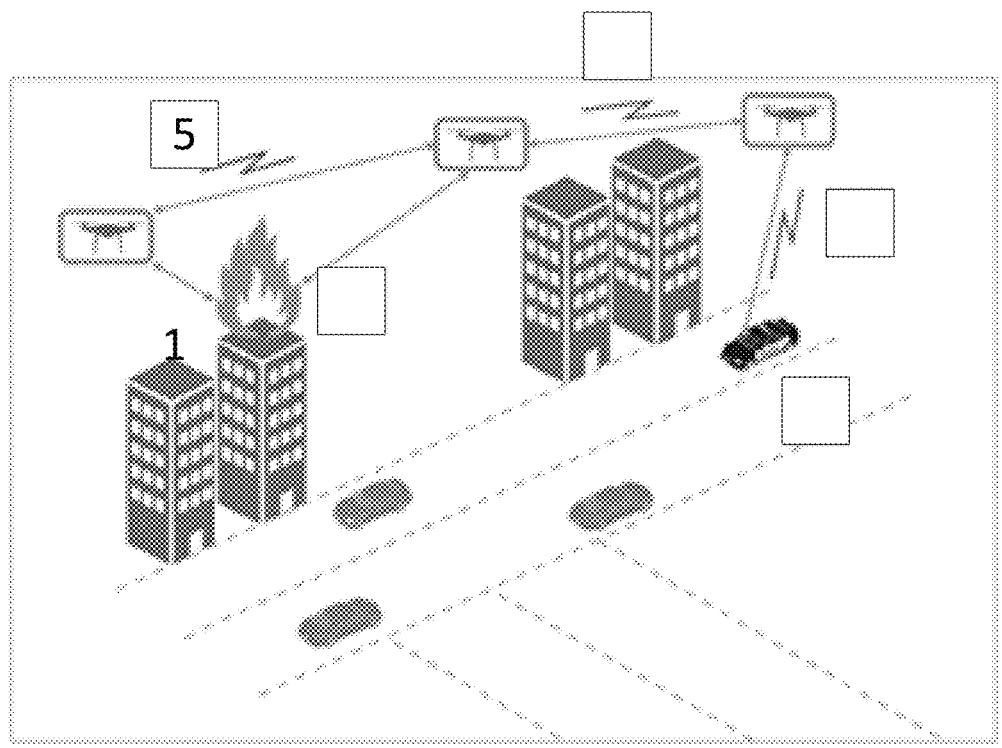
FIG. 15 is a schematic diagrammatic view of an embodiment showing short-range wireless communication when an issue is detected, and the appropriate authority issues an instruction to nearby aerial vehicles to form a multi-hop connection that is used to relay situation information back to the authority.

FIG. 15 shows a special case that will be possible using short-range wireless communication. If an issue is detected, illustrated as element 1 in FIG. 15, the appropriate authority, illustrated as element 2 in FIG. 15, can issue an instruction to nearby aerial vehicles [15-3] to form a multi-hop connection, illustrated as element 4 in FIG. 15. That multi-hop connection can then be used to relay situation information back to the authority, illustrated as element 5 in FIG. 15, for incident management.

Several embodiments have been discussed in the foregoing description. However, the embodiments discussed herein are not intended to be exhaustive or limit the disclosure to any particular form. The terminology which has been used is intended to be in the nature of words of description rather than of limitation. Many modifications and variations are possible in light of the above teachings and the disclosure may be practiced otherwise than as specifically described.

The invention claimed is:

1. A method of interfacing with a device and a vehicle operating on a local vehicle operations travelway during a peer-to-peer data exchange message sequence between the device and the vehicle to control and authenticate which vehicles operate on the local vehicle operations travelway, wherein the method is performed by a processor and a memory, wherein instructions for causing the processor to perform the method are embodied with the memory, the method comprising:

prior to the peer-to-peer data exchange message sequence, establishing system rules for the vehicle operating on the local vehicle operations travelway;

issuing to each of the device and the vehicle operating on the local vehicle operations travelway, a certificate that is cryptographically signed;

authorizing the device, by a centralized hub, to establish an authorized device to transmit an advertisement to the vehicle, wherein the advertisement includes a request for the vehicle to identify itself during the peer-to-peer data exchange message sequence;

issuing, by the centralized hub, to the authorized device, the certificate that is cryptographically signed, such that the advertisement transmitted by the authorized device includes the certificate;

wherein the system rules are configured to require the vehicle targeted by the advertisement from the authorized device with a response that is anonymous and signed with the certificate issued by the centralized hub in order to permit the authorized device and the vehicle to mutually authenticate one another as valid participants in a private and encrypted data exchange.

2. The method of claim 1, wherein the system rules are further configured to allow each of the authorized device and the vehicle to record details of the private and encrypted data exchange.

3. The method of claim 1, wherein the authorized device is at least one of a portable device, a terrestrial vehicle, and an aerial vehicle.

4. The method of claim 1, wherein the vehicle is at least one of a plurality of vehicles.

5. The method of claim 4, wherein the plurality of vehicles includes at least one of an aerial vehicle.

6. The method of claim 4, further comprising:

recording a three-dimensional set of mathematical models as a set of lines and intersections that describe predetermined paths and intersections for the local vehicle operations travelway; and distributing the three-dimensional set of mathematical models to the plurality of vehicles, such that each one of the plurality of vehicles is provided with the predetermined paths and intersections to follow when operating on the local vehicle operations travelway.

7. The method of claim 6, wherein the distributing is further defined as at least one of:

distributing at least one of the three-dimensional set of mathematical models of a line segment and a pair of nodes from the centralized hub to the plurality of vehicles; and distributing the three-dimensional set of mathematical models from one of the plurality of vehicles to another one of the plurality of vehicles.

8. The method of claim 7, wherein the three-dimensional set of mathematical models are further defined as a plurality of mathematical equations representing a plurality of line segments that are connected in a web to define paths of the local vehicle operations travelway for allowed operation of the plurality of vehicles.

9. The method of claim 8, wherein the web further includes a plurality of nodes with the plurality of line segments connecting the plurality of nodes; and
   wherein the plurality of nodes are configured to facilitate movement of at least one of the plurality of vehicles from one line segment to another line segment without stopping.

10. The method of claim 9, wherein the plurality of line segments and the plurality of nodes of the web define a first operating layer and a second operating layer; and
    wherein the first operating layer is defined at an elevation between a ground surface and an elevation of the second operating layer, to allow the plurality of vehicles to operate relative to one another at different elevations within the local vehicle operations travelway.

11. The method of claim 10, wherein an intersection of a pair of the plurality of line segments defines a sphere-about configured to facilitate at least one of a change of at least one of the plurality of vehicles in a level with respect to the ground surface and in a direction with respect to a latitude and a longitude.

12. The method of claim 6, further comprising receiving from a local operator, by the centralized hub, an update to the three-dimensional set of mathematical models to change the set of lines and intersections that describe the predetermined paths and intersections of the three-dimensional set of mathematical models for the local vehicle operations travelway.

13. The method of claim 4, further comprising:
    distributing a system update from the centralized hub to each one of the plurality of vehicles; and
    transmitting state information to each of the plurality of vehicles, to allow the plurality of vehicles to avoid one another autonomously;
    wherein the state information is data that includes at least one of a location, speed, destination, and a priority.

14. The method of claim 1, wherein the authorized device is a portable device issued to an authorized user;
    wherein the system rules are further configured to at least one of:
    require the vehicle targeted by the portable device issued to the authorized user with a response that includes at least of an identity of the vehicle is anonymous and signed with the certificate issued by the centralized hub; and
    issue orders by the portable device to the vehicle.

15. A system comprising a processor, a memory, and program code embodied with the memory for execution by the processor to implement a method of interfacing with a device and a vehicle operating on a local vehicle operations travelway during a peer-to-peer data exchange message sequence between the device and the vehicle to control and authenticate which of a plurality of vehicles operate on the local vehicle operations travelway, comprising:
    prior to the peer-to-peer data exchange message sequence, establishing system rules for the vehicle operating on the local vehicle operations travelway;
    issuing to each of the device and the vehicle operating on the local vehicle operations travelway, a certificate that is cryptographically signed;
    authorizing the device, by a centralized hub, to establish an authorized device to transmit an advertisement to the vehicle, wherein the advertisement includes a request for the vehicle to identify itself during the peer-to-peer data exchange message sequence;
    issuing, by the centralize hub, to the authorized device, the certificate that is cryptographically signed, such that the advertisement transmitted by the authorize device includes the certificate;
    wherein the system rules are configured to require the vehicle targeted by the advertisement from the authorized device with a response that is anonymous and signed with the certificate issued by the centralized hub in order to permit the device and the vehicle to mutually authenticate one another as valid participants in a private and encrypted data exchange.

16. The system as set forth in claim 15, further comprising:
    recording a three-dimensional set of mathematical models as a set of lines and intersections that describe predetermined paths and intersections for the plurality of vehicles; and
    distributing the three-dimensional set of mathematical models to the plurality of vehicles, such that each one of the plurality of vehicles is provided with the predetermined paths and intersections to follow when operating on the local vehicle operations travelway.

17. The system of claim 16, wherein the distributing is further defined as at least one of:
    distributing at least one of the three-dimensional set of mathematical models from the centralized hub to the plurality of vehicles; and
    distributing at least one of the three-dimensional set of three-dimensional set of mathematical models and a pair of nodes for providing intersections between vehicles;
    wherein at least one of a mathematical equation and a pair of point sets is a combination of a plurality of point sets and a plurality of mathematical equations of line segments that are connected in a web to define paths of the local vehicle operations travelway for allowed operation of the vehicle.

18. The system of claim 17, wherein the web includes a plurality of nodes and a plurality of line segments connecting the plurality of nodes;
    wherein the plurality of nodes are configured to facilitate movement of the vehicle between line segments without stopping;
    wherein the plurality of line segments and the plurality of nodes of the web define a first operating layer and a second operating layer;
    wherein the first operating layer is defined at an elevation between a ground surface and an elevation of the second operating layer, to allow the plurality of vehicles to operate relative to one another at different elevations within the local vehicle operations travelway; and
    wherein an intersection of a pair of the plurality of line segments defines a sphere-about configured to facilitate at least one of a change in a level of the vehicle with respect to the ground surface and a change in direction.

19. The system of claim 16, further comprising:
    receiving from a local operator, by the centralized hub, an update to the three-dimensional set of mathematical models that define the local vehicle operations travelway to change the set of lines and intersections that describe the predetermined paths and intersections for the local vehicle operations travelway;

distributing a system update from the centralized hub to each of the plurality of vehicles; and transmitting state information to each of the plurality of vehicles, to allow the plurality of vehicles to avoid one another autonomously;

wherein the state information is data that includes at least one of a location, speed, destination, and a priority.

20. The system of claim 15, wherein the authorized device is a portable device issued to an authorized user;

wherein the system rules are further configured to at least one of:

require the vehicle targeted by the portable device issued to the authorized user with a response that includes at least an identify of the vehicle is anonymous and signed with the certificate issued by the centralized hub; and issue orders by the portable device to the vehicle.

\* \* \* \* \*